(12) United States Patent
Vlad

(10) Patent No.: US 12,017,538 B2
(45) Date of Patent: Jun. 25, 2024

(54) LIGHT-BASED TERRESTRIAL VEHICLE NETWORK

(71) Applicant: LightSpeed Technologies LLC, Keller, TX (US)

(72) Inventor: Ovidiu Gabriel Vlad, Naperville, IL (US)

(73) Assignee: LightSpeed Technologies LLC, Keller, TX (US)

( * ) Notice: Subject to any disclaimer, the term of this patent is extended or adjusted under 35 U.S.C. 154(b) by 0 days.

(21) Appl. No.: 17/884,223

(22) Filed: Aug. 9, 2022

(65) Prior Publication Data

US 2022/0388398 A1     Dec. 8, 2022

Related U.S. Application Data

(63) Continuation of application No. 17/157,104, filed on Jan. 25, 2021, now Pat. No. 11,413,964, which is a continuation of application No. 16/133,363, filed on Sep. 17, 2018, now Pat. No. 10,899,230.

(60) Provisional application No. 62/559,965, filed on Sep. 18, 2017.

(51) Int. Cl.
*B60L 1/00*     (2006.01)
*H04B 10/278*   (2013.01)
*H04B 10/80*    (2013.01)
*G05F 1/625*    (2006.01)

(52) U.S. Cl.
CPC .............. *B60L 1/00* (2013.01); *H04B 10/278* (2013.01); *H04B 10/807* (2013.01); *G05F 1/625* (2013.01)

(58) Field of Classification Search
CPC ....... B60L 1/00; H04B 10/278; H04B 10/807; G05F 1/625
See application file for complete search history.

(56) References Cited

U.S. PATENT DOCUMENTS

| 10,899,230 B2 | 1/2021 | Vlad |
| 2008/0089087 A1 | 4/2008 | Stoner |
| 2008/0271777 A1 | 11/2008 | Stoner et al. |

(Continued)

FOREIGN PATENT DOCUMENTS

DE     102006036561 A1     3/2008

OTHER PUBLICATIONS

PCT Search Report and Written Opinion from International Patent Application No. PCT/US2018/051517 dated Dec. 6, 2018; 17 pages.

*Primary Examiner* — Daniel Cavallari
(74) *Attorney, Agent, or Firm* — Fitch, Even, Tabin & Flannery LLP

(57) ABSTRACT

At least one source of light mounted in a terrestrial vehicle optically couples to one or more light-bearing conduits. Various sizes of conduit can be utilized and the conduits can be grouped or physically separated. One, some, or all of these light-bearing conduits may carry any or all of visible light, data-bearing light, and power conveying light for use by any of a variety of illumination components, data-capable components, and light-to-electricity conversion components, respectively. A given component may itself constitute both an illumination component and a data-capable component, or both an illumination component and a light-to-electricity conversion component, or both a data-capable component and a light-to-electricity conversion component, or a component that constitutes each of an illumination component, a data-capable component, and a light-to-electricity conversion component as desired.

18 Claims, 10 Drawing Sheets

(56) References Cited

U.S. PATENT DOCUMENTS

2009/0324177 A1 12/2009 Qian et al.
2011/0211845 A1 9/2011 Vogley et al.

LIGHT-BASED TERRESTRIAL VEHICLE NETWORK

CROSS-REFERENCE TO RELATED APPLICATIONS

This application is a continuation of U.S. patent application Ser. No. 17/157,104, filed Jan. 25, 2021, which is a continuation of U.S. patent application Ser. No. 16/133,363, filed Sep. 17, 2018, now U.S. Pat. No. 10,899,230, which claims the benefit of U.S. Provisional Application No. 62/559,965, filed Sep. 18, 2017, which are incorporated by reference in their entirety.

TECHNICAL FIELD

These teachings relate generally to terrestrial vehicles.

BACKGROUND

Terrestrial vehicles of various kinds are known in the art. As used herein, "terrestrial vehicle" refers to a vehicle that is physically configured to move from one place to another while in physical contact with the ground. As used herein, a vehicle is not a terrestrial vehicle merely because the vehicle can move while in contact with the ground when that capability constitutes only a secondary means of locomotion as compared to some primary non-terrestrial means of moving. Accordingly, an airplane is not a terrestrial vehicle notwithstanding an ability of the airplane to move while in contact with the ground. A non-complete listing of terrestrial vehicles would include automobiles, trucks, motorhomes, vans, fire engines, various earthmovers, motorcycles, tracked vehicles such as tanks, and railroad engines and cars. (Any references herein to the word "vehicle" (and various forms thereof) in the absence of a qualifying adjective such as "terrestrial" shall be understood to refer to "terrestrial vehicle.")

Many modern terrestrial vehicles are highly complex, multi-component and multi-system aggregations. This complexity supports highly sophisticated locomotion platforms, safety systems, navigation and guidance systems (up to and including autonomous capabilities), and driver/passenger comfort and information systems, to note but a few examples in these regards. These systems include a variety of sensors, actuators, computational platforms, user interfaces, and so forth that often require electric power and/or data communications. As a result, modern terrestrial vehicles often include a vast array of electrical conductors and corresponding fuses, transformers, and so forth to provide the necessary corresponding power and data connections.

Unfortunately, many terrestrial vehicles are not an ideal staging platform for such an approach. Such an approach can often add tens or hundreds of pounds to the vehicle's weight. That additional weight, in turn, usually subtracts from the fuel efficiency of the vehicle. In addition, at least some portions of many terrestrial vehicles (such as the engine compartment) present ambient extremes that can be detrimental to the longevity and/or operability of electrically-conductive wiring. Furthermore, the ever-increasing complexity of vehicular wiring harnesses increases space requirements within the vehicle while often increasing installation and maintenance challenges and the opportunity for wiring errors.

Furthermore, in some specialized application settings standard electrical conductor wiring practices in a terrestrial vehicle give rise to considerable electromagnetic interference (EMI). That EMI may be disruptive to other external systems and/or may make it easier for unauthorized entities to detect the presence and/or movement of the vehicle.

BRIEF DESCRIPTION OF THE DRAWINGS

The above needs are at least partially met through provision of the light-based terrestrial vehicle network described in the following detailed description, particularly when studied in conjunction with the drawings, wherein.

Figure 1:
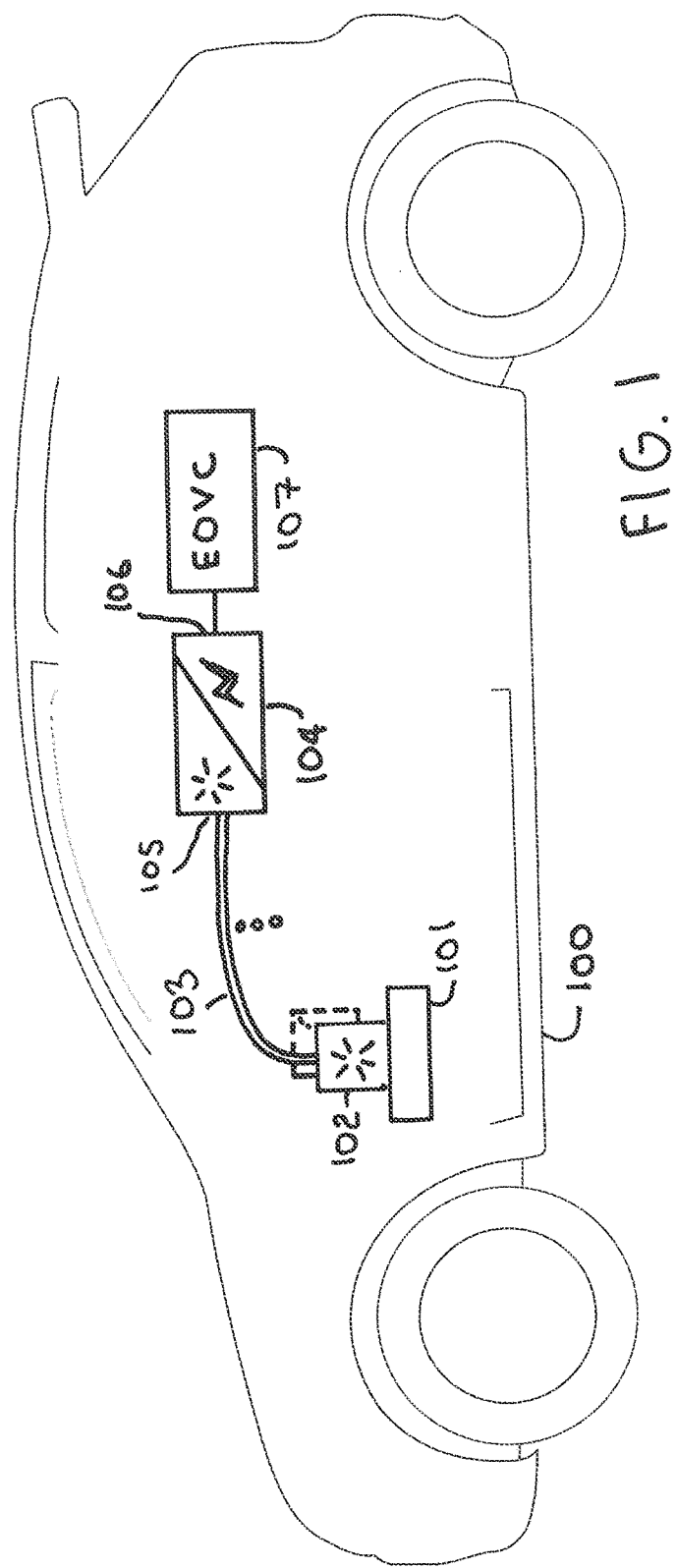
FIG. 1 comprises a side-elevational block diagram view as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a terrestrial vehicle includes at least a first structural component having a first source of light (and possibly more) secured thereto. (Additional light sources may be secured to the terrestrial vehicle as well if desired.) This first source of light may output light in a visible spectrum, a non-visible spectrum (such as the infrared spectrum), or both a visible and non-visible spectrum. By one approach, a visible component of the provided light compromises a visible marker to warn of an active light source.

The terrestrial vehicle also includes at least one electrically-operated vehicular component. These teachings are highly flexible in these regards and will accommodate a wide variety of such components. Examples include but are not limited to components that facilitate a locomotion capability of the terrestrial vehicle, components that facilitate sensing an operating status of at least one aspect of the terrestrial vehicle, components that facilitate passenger comfort, and components that facilitate providing informational content to a passenger.

In these embodiments the electrically-operated vehicular component conductively couples to the electricity-providing output of a light-to-electricity conversion component. The latter component has a light-receiving input that operably couples to at least a first light-bearing conduit. The first light-bearing conduit can comprise an optical fiber. By one approach the dimensions (in particular, the cross-section) of the fiber can vary in accordance with power requirements. Generally speaking, the larger the cross-section of the fiber, the greater the power-carrying capability thereof.

That light-bearing conduit in turn couples to the aforementioned first source of light (and possibly other sources of light). So configured, the light-to-electricity conversion component provides electricity to operate the at least one electrically-operated vehicular component.

By one approach a plurality of light-bearing conduits are utilized to also convey light to the light-to-electricity conversion component. So configured, the light-to-electricity conversion component converts light conveyed by a plurality of light-bearing conduits into electricity to operate the electrically-operated vehicular component.

If desired, an electricity-storage component can be operably coupled between the electricity-providing output of the light-to-electricity conversion component and the at least one electrically-operated vehicular component. Using this approach, power can be at least temporarily available to the vehicular component even if the light source is disabled or the conduit severed. Also, using this approach, a larger quantity of stored energy can be available to operate a particularly heavy load (such as, for example, a door-opening motor) than might be available or feasible to deliver in real time via the conduit.

The aforementioned light-bearing conduit can also serve to convey light that acts as a data carrier. In particular, light that is modulated with informational content. So configured, the light-bearing conduit can convey data to and/or from one or more data-capable components. If desired, the latter functionality can occur simultaneously with providing light-based power to the data-capable components via a same shared light-bear conduit(s) per the description above.

Also if desired, the aforementioned light-bearing conduit can also serve to convey light to one or more illumination components that are configured to provide surface illumination using visible light as sourced by at least one source of light that comprises a part of the terrestrial vehicle. This can include illumination components that are configured to provide interior surface illumination for the terrestrial vehicle as well as illumination components that are configured to provide exterior surface illumination for the terrestrial vehicle. (Headlights are one useful example of an illumination component that provides exterior surface illumination. In that case, and as an illustrative example in these regards, a bundle of thirty 1.0 mm optical fibers can provide the lighting performance equivalent of a modern headlight, including both high beam as well as low beam settings.)

By one approach, these teachings provide for a terrestrial vehicle having at least one electrically-operated vehicular component, at least one data-capable component, and at least one illumination component configured to provide surface illumination, along with a light source comprising at least a first source of light that secures to a structural component of the terrestrial vehicle. The terrestrial vehicle can also include a light-to-electricity conversion component having a light-receiving input and an electricity-providing output, wherein the electricity-providing output is conductively coupled to the at least one electrically-operated vehicular component. At least a first light-bearing conduit (and possibly more) operably couples between the light source(s) and each of the light-receiving inputs of the light-to-electricity conversion component, the illumination component, and the data-capable component. So configured, the light-bearing conduit(s) utilizes light sourced by one or more light sources to power electrically-operated vehicular components, to provide visible light to illuminate surfaces, and to convey data via light to and/or from data-capable components.

Appropriately selected optical conduit can be considerably lighter than a corresponding electrical conductor. Appropriately protected optical conduit can withstand the harsh extremities of various portions of the terrestrial vehicle (such as the engine compartment). The data-carrying capacity of an optical conduit can greatly exceed the corresponding capacity of electrical conductors and the power-carrying capacity of an optical fiber can be sufficient to meet the needs of various electrically-operated components. The ability of an optical conduit to serve more than one function and/or the needs of multiple components can lead to an overall reduction in the number of "wires" that must be deployed in the terrestrial vehicle, even when additional optical conduits are utilized (at least in part) to provide redundancy.

These and other benefits may become clearer upon making a thorough review and study of the following detailed description. Referring now to the drawings, and beginning with FIG. 1, an illustrative example that is compatible with many of these teachings will be presented.

FIG. 1 presents a terrestrial vehicle 100. For the sake of an illustrative example and without intending to suggest any particular limitations in these regards, the terrestrial vehicle 100 comprises an automobile having a frame, four ground-contacting wheels, an engine (which may be an internal combustion engine, a diesel engine, an electric engine, a gas-fueled engine, or any hybrid or other combination of the foregoing), a drive train including a transmission, a passenger area, driver and passenger controls, and so forth. Such components and features are well known in the prior art. As the present teachings are not especially sensitive to any particular choices in these regards, further elaboration regarding such components and features is not provided here except where possibly relevant to the discussion provided herein.

In this example the terrestrial vehicle 100 includes a first structural component 101. This first structural component 101 is secured internally to the terrestrial vehicle 100 (for example, by welding, an adhesive, clips, snaps, any of a variety of threaded members such as screws or bolts, brads, and so forth). This first structural component 101 may be comprised of any suitable material including but not limited to a metal, wood, stone, ceramic, plastic, glass, or composite material, to note but a few examples in these regards. The first structural component 101 may have essentially any form factor and/or shape and may serve any of a variety of purposes (including providing structural support to the terrestrial vehicle 100, or not). The first structural component 101 may be disposed in a visually exposed area or in a more concealed area as desired. In a typical application setting the first structural component 101 will be disposed fully within the interior of the terrestrial vehicle 100 though a partial or completely exterior location may be appropriate in some cases.

It will be further understood that the terrestrial vehicle 100 may well include a plurality of such structural components. In such a case the plurality of structural components 101 may be disposed in close proximity to one another or may be disposed variously around and about the terrestrial vehicle 100 (for example, in the engine compartment, behind the dash in the interior cabin, in the trunk, under the floorboard, and so forth). In such a case the various structural components 101 may be similarly shaped and/or purposed or may represent a variety of different shapes and/or purposes.

At least one, and possibly more, source of light 102 is secured to the first structural component 101. This first (and possibly other) source of light 102 will typically be electrically powered and accordingly will be operably coupled to a source of electricity such as a battery (not shown). In such a case the battery may, or may not, be one or more vehicular batteries (i.e., a battery that is included with the terrestrial vehicle 100 to provide electric power to components other than the first source of light(s) 102).

The first source of light 102 may itself include a single, solitary light source or a plurality of discrete, independent light sources as desired. When multiple light sources are utilized they may be identical to one another or may differ from one another as regards any of power, intensity, light frequency, and so forth. When multiple light sources are utilized their output light may be combined into a single output that constitutes the output of the first source of light 102.

The light output by the first source of light 102 may be visible light, non-visible light (such as infrared light) only, or light having both visible and non-visible spectrum. As described in more detail below, visible light may serve a surface-illumination purpose and/or may serve as a visible marker to warn of an active light source (when, for example, the visible light component is conveyed in combination with a light component that conveys power as described herein).

The output(s) of the source of light(s) 102 operably couple to at least a first light-bearing conduit 103. So configured this light-bearing conduit 103 conveys light from the first source of light 102 to other locations and components corresponding to the terrestrial vehicle 100. In a typical application setting there will likely be a plurality of such light-bearing conduits (103) that attach respectively to one or more of the aforementioned mentioned sources of light 102.

By one approach at least some of the light-bearing conduits 103 comprise optical fiber comprised of, for example, a polymer-based plastic optical fiber or a plastic optical fiber having at least some polymer content.

The diameter/cross-section of a given light-bearing conduit 103 can vary to suit the needs of a particular application. For example, a light-bearing conduit 103 that serves to convey a larger amount of power (such as 15 watts or more) may have a larger diameter than a light-bearing conduit 103 that serves to convey a smaller amount of power (such as only 1 or 2 watts of power). Appropriate selections in these regards can be based, for example, upon the anticipated power requirements of the corresponding components that are to be powered. Illustrative examples in these regards include but are not limited to light-bearing conduits 103 having a diameter of 1.0 mm, 3.0 mm, 5.0 mm, 7.0 mm, or 15.0 mm. It is also possible to use a greater number of smaller-diameter conduits as versus a fewer number of larger-diameter conduits, or vice versa, to serve a similar aggregate purpose. For example, at least 16 watts of power can be conveyed by eight 1.0 mm conduits (presuming 2 watts per conduit), or by sixteen 1.0 mm conduits (presuming 1 watt per conduit), or three 3.0 mm conduits (presuming 6 watts per conduit).

In some cases, and as described below in more detail, multiple light-bearing conduits 103 will be configured to provide a redundant supply of resources to one or more downstream components. For example, a given component that utilizes power provided by such a conduit may, in fact, operably couple to at least three physically-distinct light-bearing conduits 103 that each independently provide a sufficient amount of light-based power to the given component. So configured, interruption of the light flow of only one or two of these light-bearing conduits 103 will not, in and of itself, suffice to interrupt the functioning of the given component.

With redundancy in mind, by one approach the various light-bearing conduits 103 can be generally disposed within the terrestrial vehicle 100 substantially distal from one another. For example, the aforementioned three independent light-bearing conduits 103 may be spaced apart from one another, for at least ninety percent of their lengths, by at least six inches, or one foot, or by three feet, or by some other distance of choice. As another example, at least a substantial part of one of the light-bearing conduits 103 may be disposed along a driver side of the terrestrial vehicle 100, at least a substantial part of the second of the light-bearing conduits 103 may be disposed along a passenger side of the terrestrial vehicle 100, and at least a substantial part of the third of the light-bearing conduits 103 may be disposed along the ceiling or the floor of the terrestrial vehicle 100. (As used in this paragraph, the word "substantial" will be understood to mean at least forty percent of the length of the respective conduit.)

If desired, at least some of the light-bearing conduits 103 can be provided, for at least a portion of their respective length, with supplemental, conformal, thermally-insulative cladding. Such cladding can serve to protect the operational and physical integrity of the conduit 103 in environmentally-challenging locations such as an engine compartment. A cladding that is not especially thermally protective may be useful for light-bearing conduits 103 intended to bear power-conveying light.

In this illustrative example at least one of the light-bearing conduits 103 operably couples to at least one light-to-electricity conversion component 104. This light-to-electricity conversion component 104 has at least one light-receiving input 105 that operably (i.e., at least optically) couples to the corresponding light-bearing conduit 103. This light-to-electricity conversion component 104 also has at least one electricity-providing output 106.

The light-to-electricity conversion component 104 is configured to convert at least some of the light received at the light-receiving input 105 into electricity and to provide that electricity to the at least one electricity-providing output 106. A variety of photonically-sensitive materials are known in the art that will serve in these regards, with gallium arsenide being one particularly useful example. For example, wafers of gallium arsenide ranging in diameter size from 1.0 to 7.0 mm can output from 1.0 to 3.3 volts at 7.0 to 20.0 watts with conversion efficiency generally ranging from twenty to eighty percent.

Additional components can be utilized as desired to smooth, regulate, and otherwise shape and control the resultant electricity. Generally speaking, the electricity provided by the light-to-electricity conversion component 104 constitutes direct current (DC) electricity. If desired, an inverter can serve to convert the DC electricity into alternative current (AC) electricity.

In this example the terrestrial vehicle 100 also includes at least one electrically-operated vehicular component 107. This electrically-operated vehicular component 107 conductively couples (i.e., electrically conductively couples) to the electricity-providing output 106 of at least the one light-to-electricity conversion component 104. By one approach the electrically-operated vehicular component 107 can so couple to a plurality of light-to-electricity conversion components 104 in order to provide a redundant supply of electricity and/or to provide, in the aggregate, a greater amount of power than can be delivered by any one light-to-electricity conversion component 104.

In this illustrative example the electrically-operated vehicular component 107 and the light-to-electricity conversion component 104 are shown as physically separate and discrete components. So configured, the light-to-electricity conversion component 104 may be configured and coupled to provide electricity to a plurality of electrically-operated vehicular components 107 if desired. If desired, however, the light-to-electricity conversion component 104 can be physically incorporated into the electrically-operated vehicular component 107 such that, for example, these two elements share a same component housing and possibly even a same integrated circuit and/or printed circuit board.

Generally speaking, the electrically-operated vehicular component 107 constitutes a component that is an integral part of the terrestrial vehicle 100 itself. The particular functionality served by the electrically-operated vehicular component 107 can vary. Examples in these regards include but are not limited to an electrically-operated vehicular component 107 that facilitates a locomotion capability of the terrestrial vehicle, an electrically-operated vehicular component 107 that facilitates sensing an operating status of at least one aspect of the terrestrial vehicle, an electrically-operated vehicular component 107 that facilitates passenger comfort, and an electrically-operated vehicular component 107 that facilitates providing informational content to a passenger.

By one approach essentially all electrically-operated vehicular components 107 in the terrestrial vehicle 100 can be powered by light delivered by one or more of the above-described light-bearing conduits 103. This approach offers numerous benefits including a significant reduction in weight (representing at least the difference between the weight of the previously-utilized electrical conductors as versus the weight of the much-lighter light-bearing conduits), a reduced EMI profile, potentially increased reliability (due at least to the redundancy described herein), and so forth.

Figure 2:
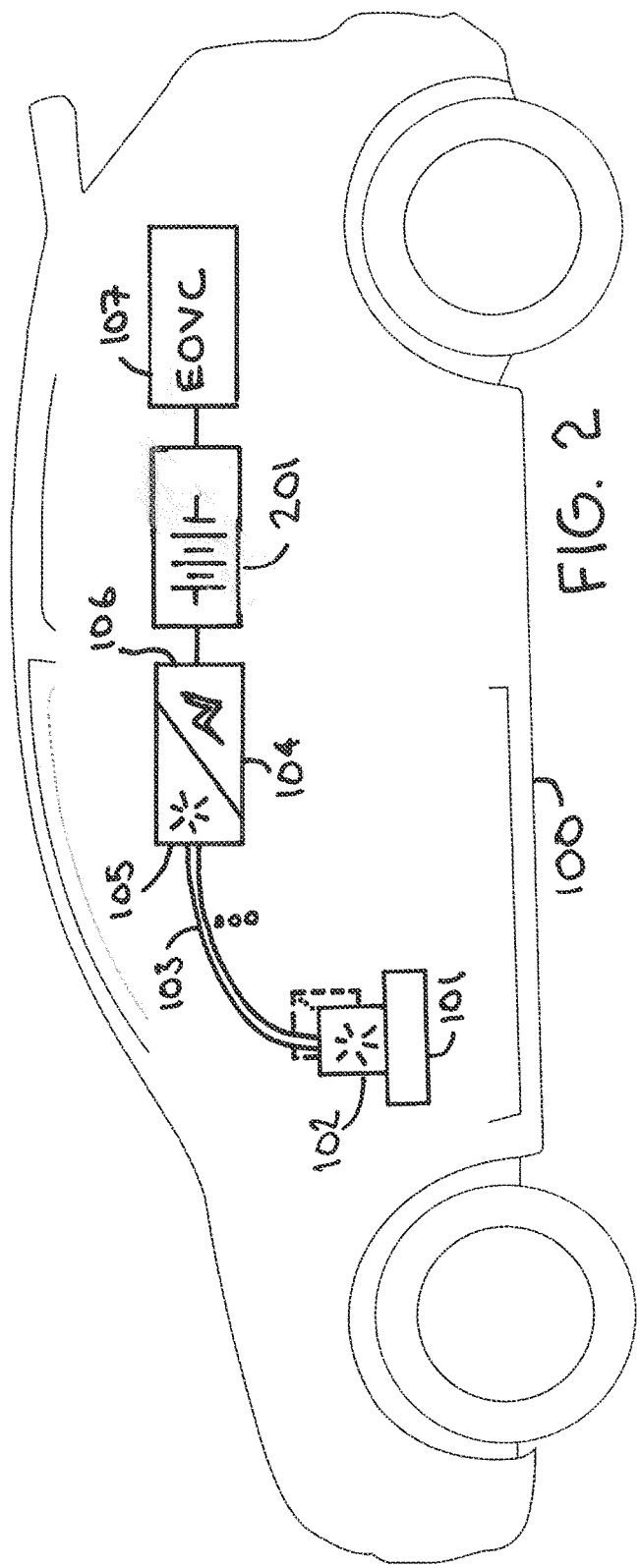
FIG. 2 comprises a side-elevational block diagram view as configured in accordance with various embodiments of these teachings.

In some instances the instantaneous power that can be delivered by available light to a given electrically-operated vehicular component 107 may be insufficient for the needs of that component. For example, a motor (such as a door lift motor) may require more instantaneous power than the available light-bearing network can support. In such a case, and referring now to FIG. 2, the terrestrial vehicle 100 can further include at least one electricity-storage component 201 that operably couples between the electricity-providing output 106 of a corresponding light-to-electricity conversion component 104 and the corresponding electrically-operated vehicular component 107. This electricity-storage component 201 may comprise, for example, one or more cells/batteries and/or capacitors that store electrical energy in an amount suitable to meet the instantaneous needs of the electrically-operated vehicular component 107. In lieu of serving that purpose, or in combination therewith, this electricity-storage component 201 can also serve to provide operating electricity to the electrically-operated vehicular component 107 even in the absence of provided light.

Figure 3:
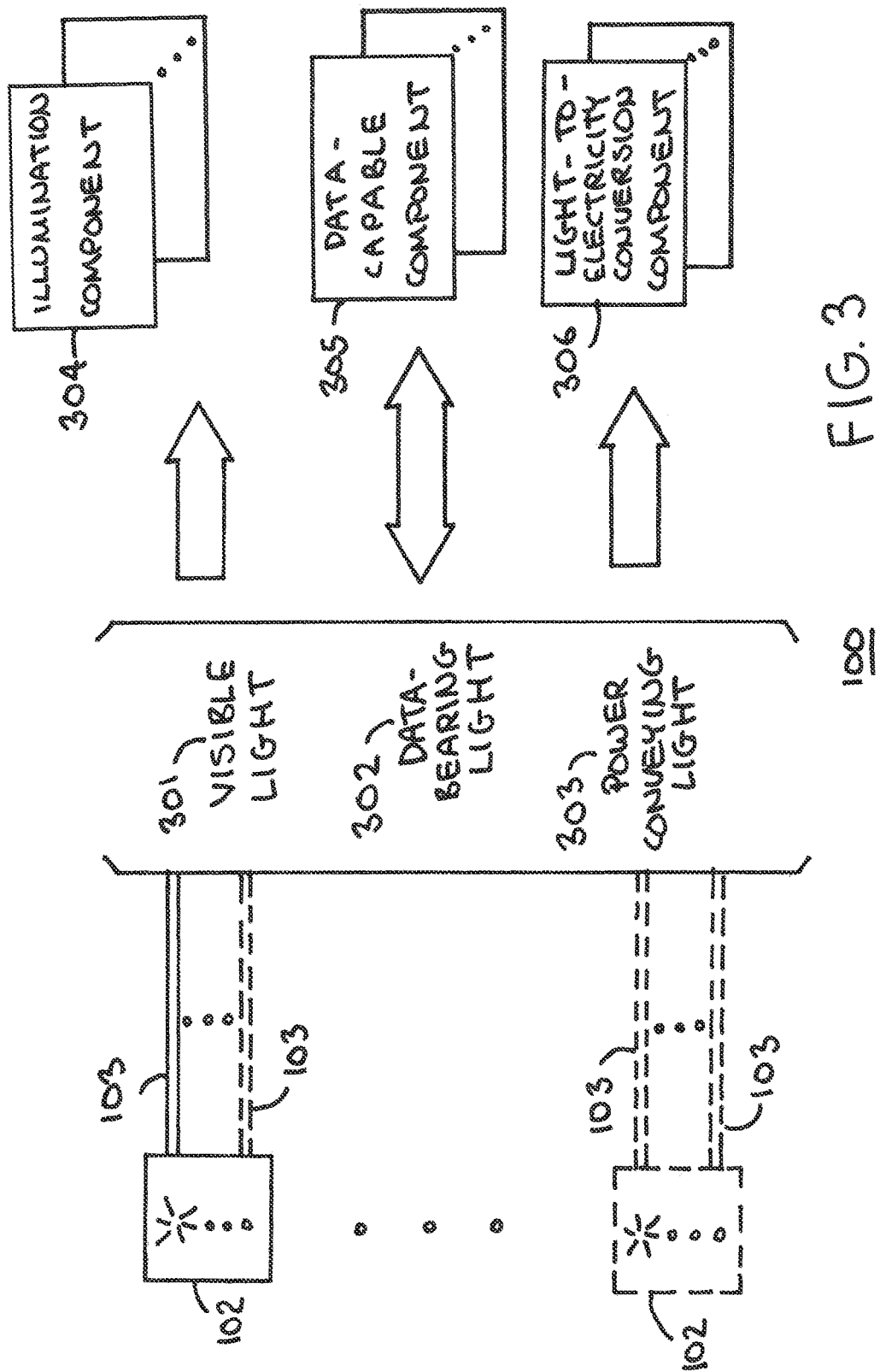
FIG. 3 comprises a block diagram as configured in accordance with various embodiments of these teachings.

As noted above, these teachings will readily accommodate a network of light-bearing conduits 103 that convey light from one or more sources of light 102 to a plurality of components in support of a variety of purposes. FIG. 3 provides an instructive example in these regards.

In this example at least one source of light 102 and possibly many more sources of light 102 are provided within the terrestrial vehicle 100 (for example, as described above). As noted above, each source of light 102 may itself include one or more light sources and may have one or more optically discrete light outputs. Accordingly, light may be available in a variety of intensities and frequencies for use by the network.

Also in this example, each source of light 102 optically couples to one or more light-bearing conduits 103. Regardless of which source of light 102 a given light-bearing conduit 103 is so attached, the light-bearing conduit 103 may be run in tandem with other co-located light-bearing conduits 103 or may be disposed physically discrete from one or more other light-bearing conduits 103 in the terrestrial vehicle 100. These light-bearing conduits 103 may all be identical to one another in terms of diameter, material, and cladding or may vary in any of those regards from one another.

As illustrated in FIG. 3, one, some, or all of these light-bearing conduits 103 may carry any or all of visible light 301, data-bearing light 302, and power-conveying light 303 for use by any of a variety of illumination components 304, data-capable components 305, and light-to-electricity conversion components 306. With that in mind, it will be understood that a given component may itself constitute both an illumination component and a data-capable component, or both an illumination component and a light-to-electricity conversion component, or both a data-capable component and a light-to-electricity conversion component, or a component that constitutes each of an illumination component, a data-capable component, and a light-to-electricity conversion component as desired.

Those skilled in the art will appreciate that such a network can readily accommodate a component in essentially any part of the terrestrial vehicle 100 essentially regardless of the component's functionality. It will also be appreciated that, at the very least, these teachings will accommodate supporting the functionality of a wide variety of components that typify a modern terrestrial vehicle 100 without requiring the use of electric wiring to deliver electricity from a central source to the dispersed components. Such an approach not only avoids using relatively costly and heavy electrically-conductive wires, this approach also avoids the need for corresponding fuses, transformers, isolation chokes, and so forth. Avoiding such components leads to even greater cost, weight, and space savings while also reducing design and installation complexity.

Figure 4:
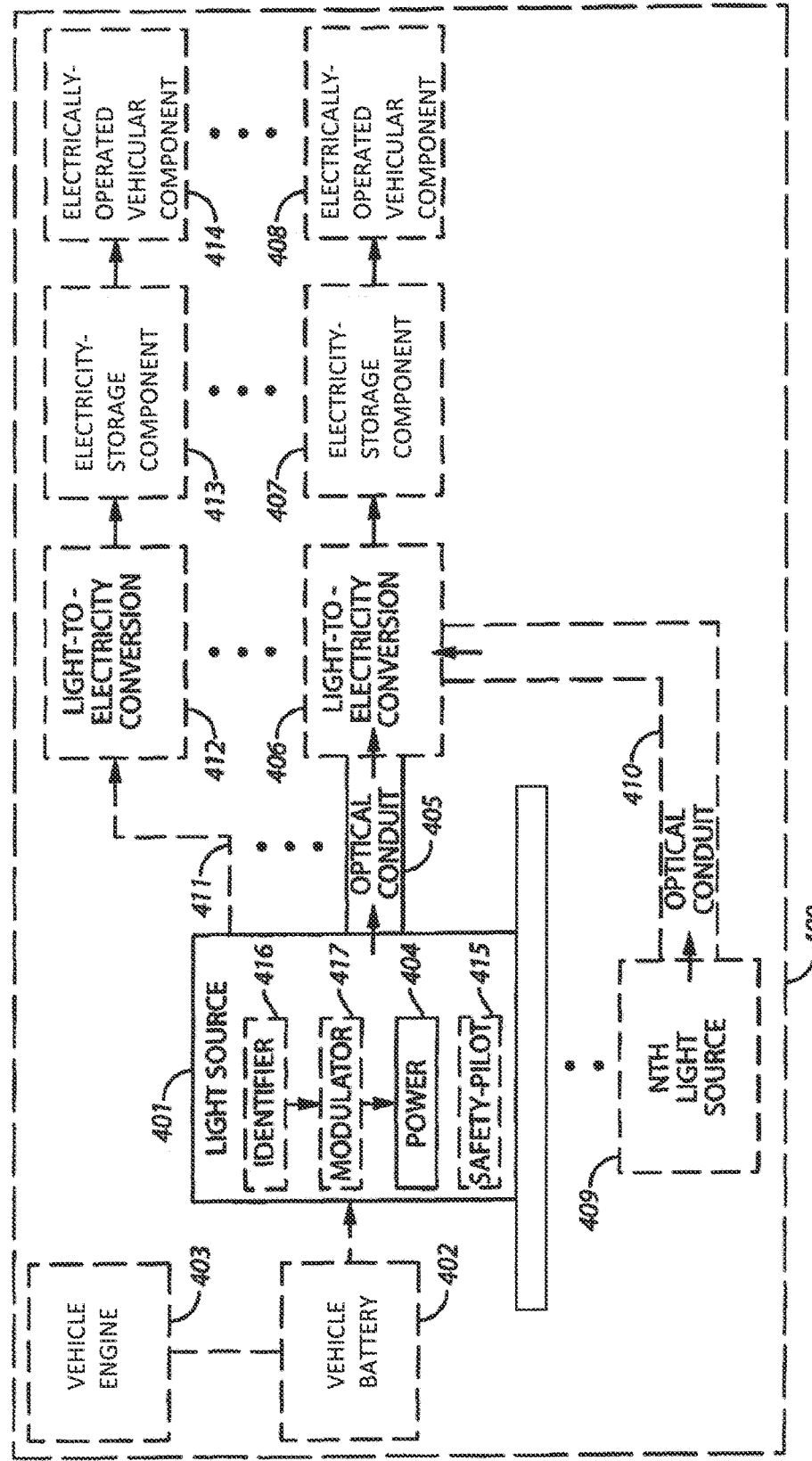
FIG. 4 comprises a block diagram as configured in accordance with various embodiments of these teachings.

Referring now to FIG. 4, a more specific example will be presented as regards the use of light as a power source. It will be understood that this example is intended to serve an illustrative purpose and is not intended to suggest any particular limitations by way of its details and specificity.

In accordance with the teachings set forth herein, this terrestrial vehicle 400 includes a source of power that comprises, in this example, a source of light 401. This source of light 401 can operably couple, if desired, to an onboard vehicle battery 402 (such as a main battery for the terrestrial vehicle 400) which may, in turn, be operably coupled to the vehicle's engine 403 that serves to maintain a charge on the vehicle battery 402. Such engines, batteries, and the like are well known in the art. As the present teachings are not overly sensitive to any particular selections in this regard, for the sake of brevity further details regarding such components will not be provided here.

This source of light 401 comprises, in this embodiment, at least a power wavelength component source 404 (such as, but not limited to, any of a number of solid-state light emitting devices such as light emitting diodes, lasers, or the like). This source of light 401 operably couples via a light-bearing conduit comprising an optical conduit 405 (for example, as described above) to a light-to-electricity conversion apparatus 406 of choice. As noted above, this light-to-electricity conversion apparatus 406 serves to convert at least the power wavelength component (or components) as sourced by the source of light 401 into electricity. By one approach, and as suggested by the illustration, this light-to-electricity conversion apparatus 406 can optionally operably couple to a rechargeable power supply comprising an electricity-storage component 407. So configured and arranged, electricity as provided by the light-to-electricity conversion apparatus 406 can serve to charge the rechargeable power supply 407.

The rechargeable power supply 407 can then couple, in turn, to a corresponding electrically-operated vehicular component 408. Virtually any electrically-powered vehicular component can be served in this manner with some examples comprising engine control and powertrain components, electro-servo mechanisms, displays, and so forth. This can comprise, if desired, a one-to-one configuration such that a single such rechargeable power supply serves to power only a single corresponding vehicular component. In the alternative, if desired, a single rechargeable power supply can serve to power a plurality of vehicular components. It would also be possible, if desired, to couple a plurality of rechargeable power supplies in parallel to a single vehicular component (in order to provide, for example, a redundant supply capacity).

If desired, these teachings will accommodate providing more than one such independent light source (as represented in the illustration by an Nth light source 409 (where "N" will be understood to comprise an integer value greater than one). By one approach, and as suggested by the illustration, two or more such sources of light can feed one or more of the same light-to-electricity conversion apparatuses. So configured, the light-to-electricity conversion apparatus has the benefit of redundant power sources and/or has a greater amount of instantaneous power available in the form of additional light. It would also be possible to use such additional light sources to power additional vehicular components independent of one another. To illustrate, a first light source could serve to power a first group of five vehicular components and a second light source could serve to power a second group of five other vehicular components.

If desired, and again as suggested in the illustration, one can also optionally couple more than one optical conduit to a given source of light (as suggested by the optical conduit denoted by reference numeral 411). Such additional optical conduits 411 can couple in a similar manner to other light-to-electricity conversion apparatuses 412, corresponding rechargeable power supplies 413, and vehicular components 414 as appropriate. So configured, those skilled in the art will recognize the resultant power distribution architecture as comprising a star distribution pattern. With such a configuration, severing of any one of the optical conduits will not have any effect upon the operability of the remaining optical conduits. It would also be possible for separate whole sets of light sources and sinks (i.e., in this illustrative embodiment, the light-to-electricity converter apparatuses) to be cross-coupled for fail-functional operation.

By one approach, the above-described rechargeable power supplies are each located relatively close to their corresponding vehicular component. In fact, if desired, such a capability can comprise a native capability of the vehicular component when the rechargeable power supply comprises an integral part of the vehicular component. This same approach can be taken with the light-to-electricity conversion apparatus as well, if desired.

It is not necessary that the source of light (either alone or in the aggregate with other sources of light) be capable of providing an instantaneous amount of energy that is capable of powering, in real time, all of the electrically powered vehicular components that may be coupled thereto. A properly sized rechargeable power supply should ensure that sufficient energy is available to operate such components for the duration of a given desired or planned operating period (such as a given journey of the vehicle).

As noted above, the source of light 401 can also serve to provide and combine a safety-pilot wavelength component 415 with the power wavelength component 404. So configured, and particularly when the power wavelength component 404 comprises a substantially or fully non-visible wavelength (such as an infrared wavelength) as described above, this safety-pilot wavelength component 415 (which can comprise a visible light of choice) can serve to warn onlookers to avoid looking into the light output by the source of light 401 while also serving to invoke a reflexive closure of the pupil in order to afford some degree of natural eye protection as well.

In lieu of the foregoing, or in combination therewith, that safety-pilot wavelength component can provide the basis for a continuous (or nearly continuous) test on the optical conduit to determine the presence or absence of that safety-pilot wavelength component. Such a test may comprise, for example, measuring the propagation delay that corresponds to reflections that occur at the receiving end of the optical conduit. Such a test can help to identify when a break or leak in the optical conduit occurs. Upon detecting such a breach in the operational integrity of the optical conduit the supply of light can be automatically switched off (or possibly diverted to a back-up optical conduit).

By one approach the source of light 401 can be provided with an identifier (that may be stored, for example, in a corresponding memory 416) that is unique, or substantially unique, to the vehicle 400 itself. This identifier can be provided, for example, to a modulator 417 that modulates a light carrier (such as, but not limited to, the power wavelength component 404, the safety-pilot wavelength component 415, or another light carrier of choice) with the identifier information. Various modulators and types of modulation are known in the art and may be applied here as appropriate. The effective data rate can comprise, if desired, a relatively low data rate. It will also be understood that such information can be transmitted on a substantially continuous, repeated basis or can be transmitted less frequently as desired.

Those skilled in the art will recognize and understand that such an apparatus 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, those skilled in the art will recognize and appreciate that these teachings provide a highly leveragable basis for distributing power throughout an application setting of choice. These teachings are readily implemented in an economically feasible manner and can easily scale to accommodate a wide range of needs and requirements. It will further be appreciated that these teachings can lead to significant weight reductions as electrical conductors and their corresponding couplers are removed as a design requirement. These teachings also serve to permit a relatively safe use of light as power source, in part through selection of appropriately sized optical fibers and in part through use of a safety-pilot wavelength component. Those skilled in the art will also recognize the value of providing a unique identifier in conjunction with the delivery of light throughout an application setting.

As noted above, these teachings can be employed to provide for the transport of data via light. This can include providing a first data bus interface that is compatible with a given data handling protocol. This first data bus interface can comprise, if desired, an optical data bus interface and, more particularly, a polymer optical data bus interface that is suitable for use in conjunction with polymer optical fiber-based data busses. If desired, this first data bus interface can comprise a full-duplex optical data bus interface. By one approach, the data bus itself will comprise a ring-configured data bus. In such a case, this first data bus interface can comprise a ring interface. If desired, this first data bus interface can be configured and arranged to transmit substantially similar data (including identical data) in opposing directions of such a ring-configured data bus substantially simultaneously.

The aforementioned data handling protocol can comprise, if desired, a simple data handling protocol. Any of a wide variety of modulation techniques as are presently known (or that will likely be developed hereafter) can be employed in this regard as these teachings are not overly sensitive to specific selections amongst such options. By one approach, the data handling protocol can essentially comprise a direct one-for-one representation of the information to be conveyed with little or no error correction. (As used herein, those skilled in the art will understand and recognize that "error correction" serves as a reference to protocol-based error mitigation, error detection, and error correction, which concepts are well understood in the art and require no further elaboration here.)

These teachings will then further optionally accommodate connecting this first data bus interface to a first data bus (such as an optical data bus as will be described in greater detail further below) that uses the aforementioned data handling protocol.

By one approach these teachings will then provide a second data bus interface that is also compatible with this same data handling protocol. In this case, however, this second data bus interface is designed and manufactured independently from the first data bus interface described above. There are various ways to achieve this result. By one approach, two different design teams are each provided with a common set of design requirements. These design requirements can provide necessary specifications regarding such things as the data handling protocol itself, the physical nature and parameters of the data bus to which these data bus interfaces will connect, form factor requirements regarding, for example, size and weight limitations, performance requirements, environmental requirements, specifications regarding quality, mean time to failure, and so forth, cost requirements, manufacturability requirements and materials limitations, and so forth. If desired, such design requirements can also stipulate, or prohibit, the use of specific components, specific manufacturers of components, subassemblies, and/or final assemblies, specific manufacturing processes, and so forth.

So approached, the first and second data bus interface are highly unlikely to share and/or experience a common mode failure. That is, both interfaces are unlikely to both fail at the same time in response to a same set of conditions aside from physically catastrophic events that might simultaneously occur to both interfaces (such as a nearby explosion of serious proportions or the like). For example, though one interface might conceivable fail due to some unique environmental circumstance, some unexpected data event, or some accumulated condition over time, the remaining interface is unlikely to also fail, at the same time, in response to these same conditions. At least one significant benefit of this approach will be made clearer below.

As with the first data bus interface, these teachings will optionally accommodate connecting this second data bus interface to a corresponding data bus. By one approach, this data bus can be discrete with respect to the aforementioned first data bus but will still preferably be compatible with the data handling protocol mentioned above.

These same steps can then be essentially repeated through provision of a third data bus interface that is again compatible with this data handling protocol but that is itself designed and manufactured independently of both the first and second data bus interfaces followed, optionally, by connection of this third data bus interface to a corresponding data bus that employs the above-described data handling protocol. And again, if desired, this data bus to which the third data bus interface connects can itself be discrete with respect to the previously mentioned data busses.

If desired, yet further data bus interfaces can be provided to further supplement the first, second, and third data bus interfaces noted above. For most purposes, however, there seems little practical value to providing additional interfaces in this regard. As used herein, these three independently designed and manufactured data bus interfaces appear sufficient to provide an extremely high level of operational reliability.

These teachings can then provide for operably coupling the first, second, and third data bus interface to at least one vehicular component such that this at least one vehicular component can interface with at least one data bus via the data handling protocol using at least one (and, more typically, all) of the first, second, and third data bus interfaces.

Figure 5:
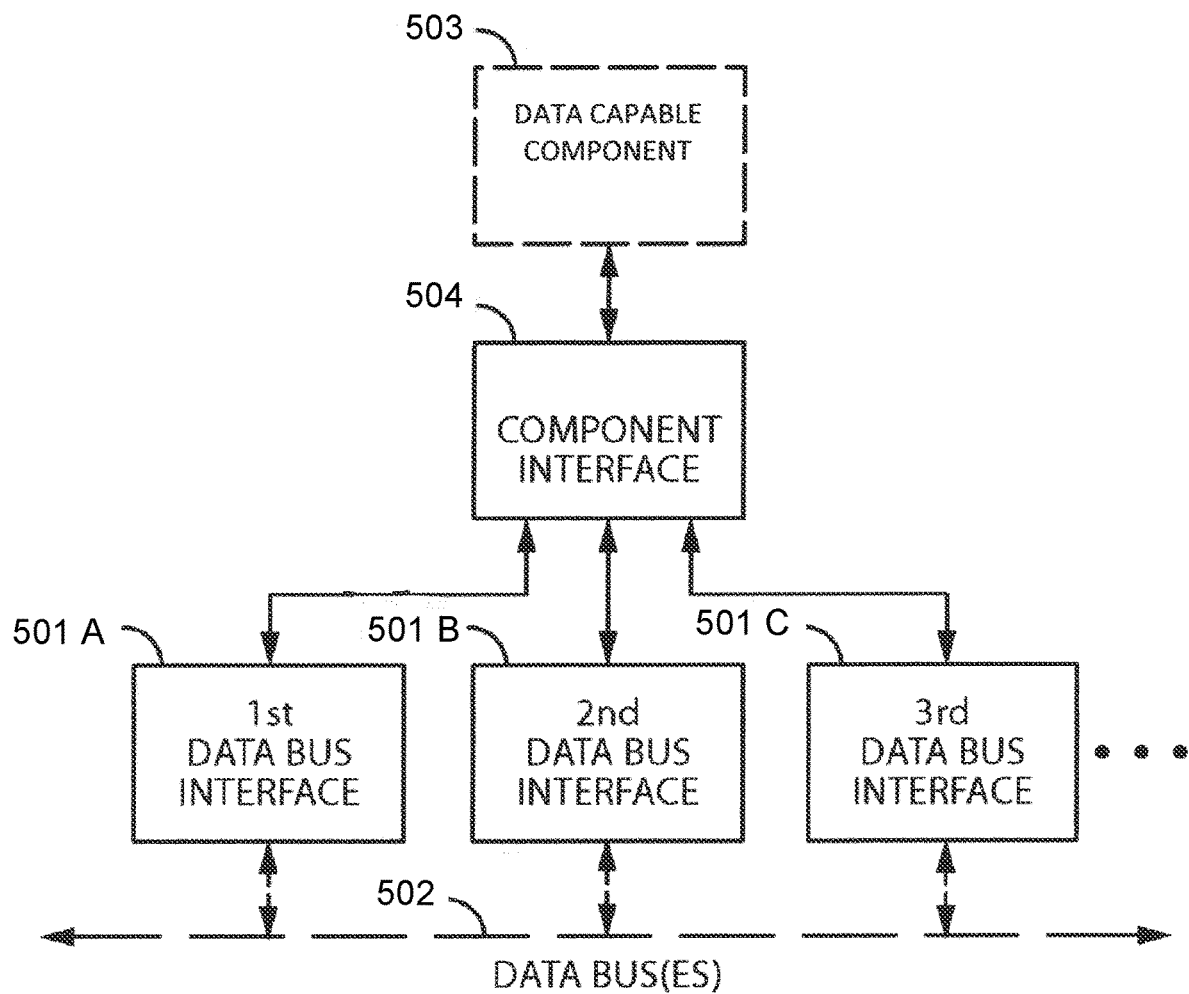
FIG. 5 comprises a block diagram as configured in accordance with various embodiments of these teachings.

Referring momentarily to FIG. 5, a corresponding vehicular data bus interface can be seen to comprise a first, second, and third data bus interface 501A-501C that each connect to a data bus 502 (or data busses as suggested above) and to a vehicular component interface 504. The latter, in turn, couples to a corresponding vehicular component 503.

There are no particular limitations with respect to the nature of the vehicular component 503 itself though this vehicular component 503 may be expected to essentially comprise, one way or the other, a data-based component. That is, the vehicular component 503 will typically source, relay, process, receive, store, and/or use information. Examples include, but are certainly not limited to, speed sensors, location-sensing equipment and global position system (GPS) receivers, wireless transmitters, radar and/or lidar, fuel level sensors, engine operational parameters sensors of various kinds, informational displays, environmental control sensors and actuators, and so forth.

As shown, there can be a one-to-one connection between a given vehicular component 503 and its corresponding vehicular component interface 504. Other possibilities exist in this regard, however. For example, if desired, the vehicular component interface could itself couple to another data bus that comprises the backbone of a local area network shared by a plurality of vehicular components. These teachings are readily compatible with such alternative architectures.

So configured, those skilled in the art will understand and recognize that this vehicular component 503 has access to a data path to facilitate its data transmission and/or reception activities via any or all of the three data bus interfaces 501A-501C. As described above, these three data bus interfaces 501A-501C are each designed and manufactured independently from one another and are therefore highly unlikely to suffer a shared failure mode. As a result, it should be highly unlikely that such an vehicular component 503 will lose its access to the data bus (or busses) 502.

The availability of three data bus interfaces as described (and particularly when used in conjunction with three corresponding independent data busses) offers further opportunities for improved reliability when viewed from the standpoint of receiving data via that bus (or busses) 502. In such a case, these teachings will further optionally accommodate operably coupling the first, second, and third data bus interfaces as well as the vehicular component to a shared data processor. So configured, such a shared data processor can then be optionally used to consolidate incoming data from the first, second, and third data bus interfaces.

This can comprise, as but one example in this regard, substantially averaging the incoming data from these data bus interfaces to provide a resultant averaged data value(s) for presentation to the corresponding vehicular component. If desired, this can further comprise determining whether the incoming data from each of the first, second, and third data bus interfaces is within a predetermined range of one another. In a case where significantly outlying data exists, for example, this process will accommodate not using incoming data from the data bus interface that is associated with data that is not within this predetermined range. The extent of this range can vary with the needs, requirements, and/or opportunities as characterize a given application setting. For example, in one setting, a relatively small range (such as 1% of an average value) may be used while another setting might permit a relatively larger range (such as 5% of an average value).

Figure 6:
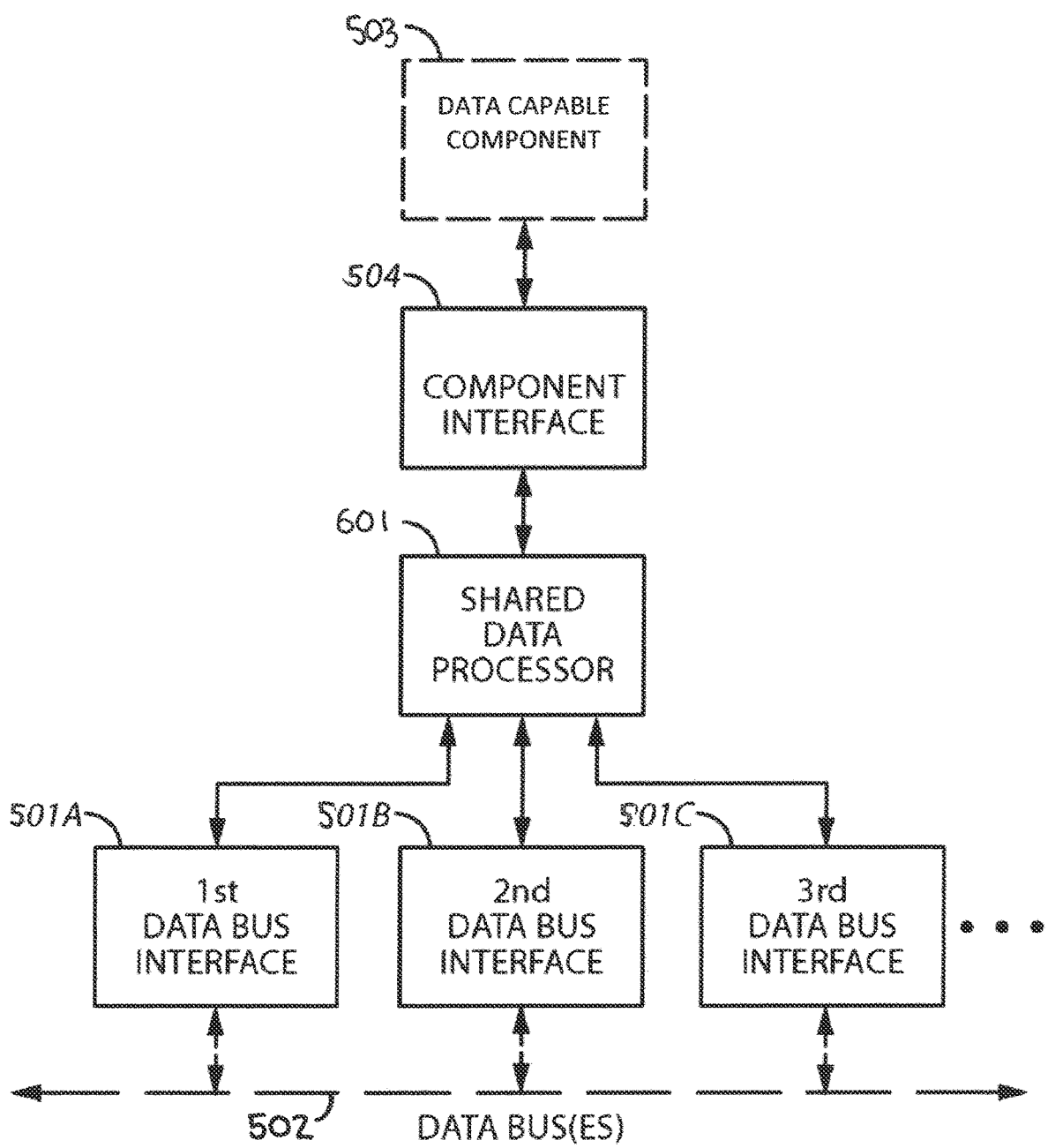
FIG. 6 comprises a block diagram as configured in accordance with various embodiments of these teachings.

To illustrate, and referring now to FIG. 6, such a shared data processor 601 can be disposed between the aforementioned data bus interfaces 501A-501C and the vehicular component interface 504. The shared data processor 601 can be comprised of a fully or partially programmable platform, such as a microprocessor, if desired. Preferably, however, the shared data processor 601 (as well as the other elements and components referred to above) comprises a softwareless platform; that is, a component that operates with hard-embodied logic and/or in the absence of logic (when possible). Such approaches and platforms are known in the art. Examples presently include, but are not limited to, field programmable gate arrays, application specific integrated circuits, programmable logic devices, and so forth. As will be well understood by those skilled in the art, such platforms are readily configured to operate as described herein.

So configured, such a shared data processor 601 can greatly increase the likely accuracy of received data. Present approaches in this regard favor the use of a single incoming data stream unless and until that data stream exhibits clear signs of degradation. The shared data processor approach, however, permits three incoming data values for a given parameter to each be used when arriving at a composite conclusion regarding a value to be used for that given parameter. So long as those three data values are each within some acceptable range, that composite result (such as, for example, a simple average of the three proffered values) will often comprise a statistically more valid result than any one of those individual data values considered in isolation.

In the embodiments shown in each of FIGS. 5 and 6, the three avenues of data movement represented by the first, second, and third data bus interfaces 501A-501C are effectively multiplexed/demultiplexed in a manner that is transparent to the vehicular component 503. By the approach shown in FIG. 5, the vehicular component interface 504 serves this purpose while the approach shown in FIG. 6 employs the shared data processor 601 to this end. Such approaches are particularly useful when applied in conjunction with legacy vehicular components that have only a single input and/or output portal. The present teachings are also readily applied, however, in conjunction with a vehicular component that is more specifically designed to operate seamlessly with these teachings. In such a case, the vehicular component could be itself configured to effectively include the aforementioned vehicular component interface and/or the shared data processor. By this approach, the vehicular component would be capable of coupling to and using the three data bus interfaces in a more integrated fashion.

In the examples illustrated above, the data bus 502 has been shown as a single data bus. As is also noted above, however, each of the data bus interfaces 501A-501C can connect to a separate data bus. For example, and referring now to FIG. 7, each of the data bus interfaces 501A-501C can couple to an individually discrete data bus (represented here by a first optical data bus 502A, a second optical data bus 502B, and a third optical data bus 502C). In this particular illustrative embodiment, each such data bus comprises a full-duplex data bus. There are various ways to achieve such a result. By one approach, for example, different light frequencies can be employed as data bearing carriers in opposing directions of the optical pathway that comprises the data bus. By another approach, each such data bus can itself be comprised of two or more independent optical fibers. For example, a first optical fiber as comprises, say, the first optical data bus 502A can be used for data moving in a first direction and a second, different optical fiber as also comprises that first optical data bus 502A can be used for data that moves in an opposite direction.

As is also noted above and as is illustrated here, each of these data bus interfaces 501A-501C comprises a fully bi-directional interface. So configured, incoming data can enter the data bus interface and be accordingly processed from either side of the optical data bus. Similarly, outgoing data can exit the data bus interface and enter either and/or both sides of the optical data bus.

Figure 7:
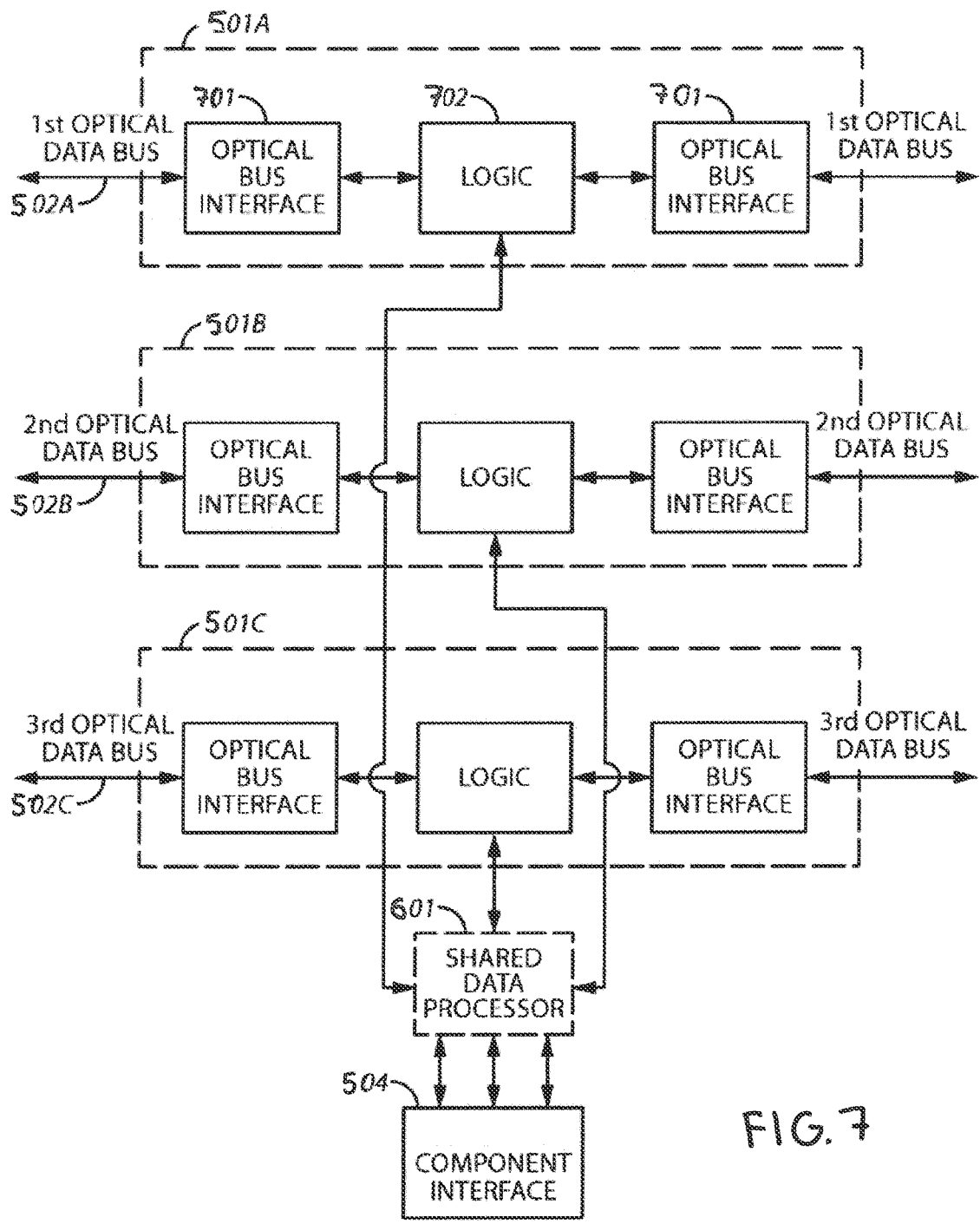
FIG. 7 comprises a block diagram as configured in accordance with various embodiments of the invention.

To facilitate such agility, and with continued reference to FIG. 7, each of the data bus interfaces (such as, for example, the first data bus interface 501A) can be comprised of two optical bus interfaces 701 that are configured and positioned to interface with both sides of the first optical data bus 502A. Each such data bus interface can also comprise, when appropriate, a logic component 702 that couples between these optical bus interfaces 701 and the aforementioned shared data processor 601 and/or vehicular component interface 504. Such logic can be configured and arranged to, for example, read and recognize destination addresses and/or source addresses, time stamps, and so forth as may accompany a given data transmission.

Such logic can also be configured to forward data intended for its particular vehicular component via the vehicular component interface 504 to that vehicular component interface 504 (and/or the shared data processor 601 when such is present), with or without temporary buffering of that data as may be appropriate to a given application setting. In a similar manner, such logic can be configured to receive data from its vehicular component and to parse, arrange, aggregate, concatenate, and/or otherwise prepare such data for transmission in a manner that is compatible with the aforementioned data handling protocol. This can also include, as appropriate, adding additional information to such a data packet including such items as a source identifier, a destination identifier, a time stamp, and so forth.

As mentioned above, by one approach these constituent components of each data bus interface 501A-501C are designed and manufactured independently of one another. As a result, for example, the optical bus interfaces of the first data bus interface 501A are different from the optical bus interfaces of the second or third data bus interfaces 501B and 501C. As another example, the logic unit as comprises a part of each of the three data bus interfaces 501A-501C are also each different from the other two.

It is also possible that the means of coupling these components together will vary from interface to interface as well. As but one illustration in this regard, the first data bus interface 501A may employ a particular lightpipe material and design to couple the optical bus interfaces 701 to the logic unit 702 while the second data bus interface 501B may instead provide for converting the optical data as is received via an optical bus interface 701 into an electrical corollary that is then provided to the logic unit 702 via a corresponding electrical conductor.

As noted above, these teachings will accommodate the use of data busses that comprise a plurality of independent optical data busses. To provide further examples in that regard, these teachings will accommodate (in, for example, a terrestrial vehicle) operably coupling a first optical data bus to each of a plurality of data-based vehicular components, operably coupling a second optical data bus to each of those same data-based vehicular components, and again operably coupling a third optical data bus to each of those same data-based vehicular components. By one approach, each of these optical data busses is independent and discrete of the others. If desired, these teachings would readily accommodate providing additional optical data busses that are similarly coupled. In general, however, three such optical data busses should be sufficient for most if not all application purposes.

Figure 8:
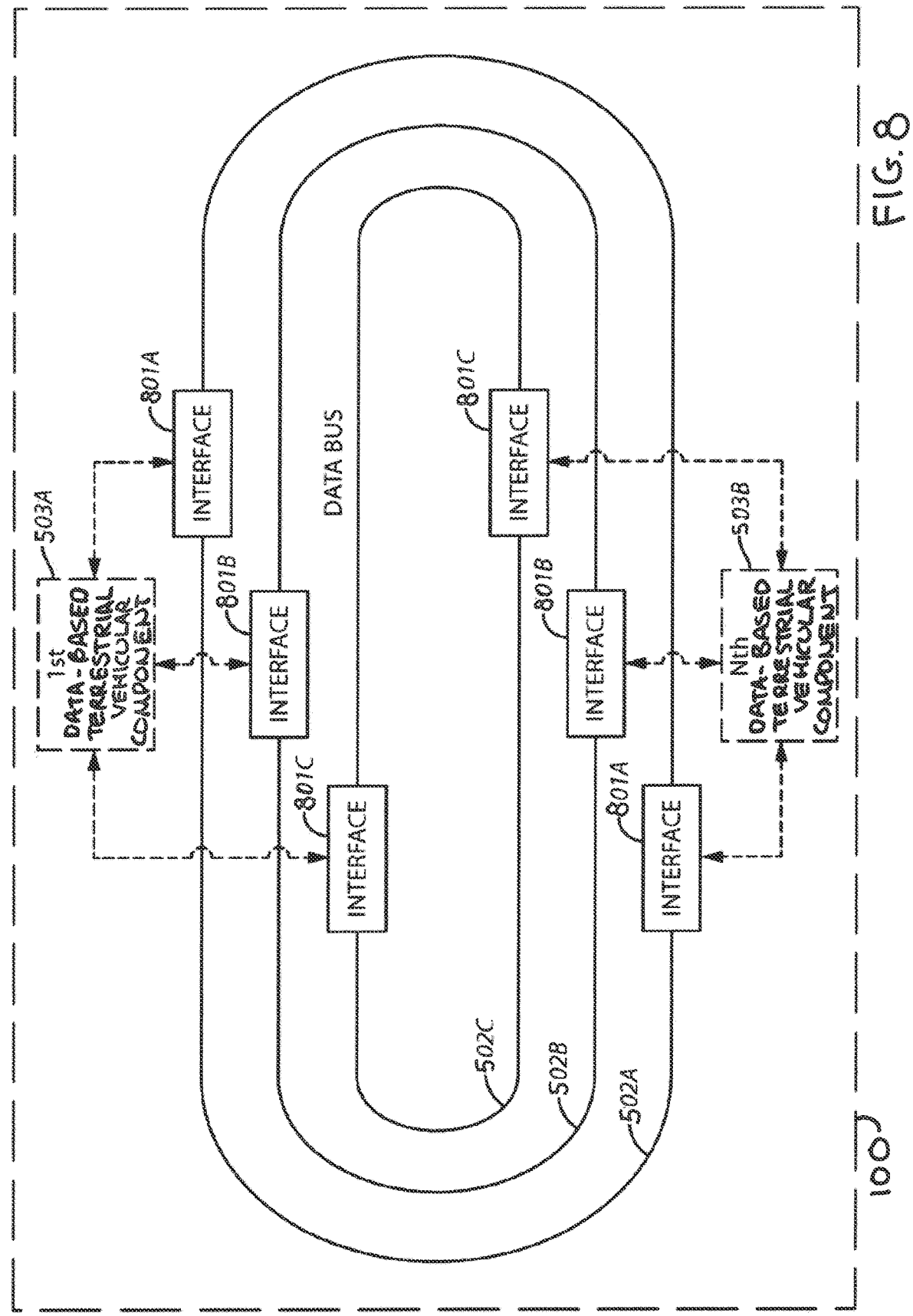
FIG. 8 comprises a block diagram as configured in accordance with various embodiments of these teachings.

FIG. 8 presents an illustrative example in this regard. In this illustrative example, each of the optical data busses 502A-502C comprises a full-duplex optical data bus made of one or more plastic optical fibers (and/or a polymer optical film waveguide) that employs a common data handling protocol (i.e., a same data handling protocol). By one approach, as noted earlier above, this data handling protocol can comprise a relatively simple protocol that eschews, for example, making provision for any error correcting capability or functionality. In the embodiment shown, each such optical data bus 502A-502C also comprises a separate ring-configured optical data bus.

Each of these optical data busses 502A-502C operably couples (via, for example, interfaces 801A-801C such as, but not limited to, those described above) to each of a plurality of data-based vehicular components (represented here by a first data-based terrestrial vehicle component 503A through an Nth data-based terrestrial component 503B where "N" shall be understood to refer to an integer value greater than one). So configured, as will be well understood by those skilled in the art, any given such data-based terrestrial vehicular component can transmit data via each of three separately designed and manufactured data bus interfaces and via each of three separate and discrete data busses to another data-based terrestrial vehicular component.

Notwithstanding that the data-handling protocol employed by each of the data busses may be utterly bereft of any native error correction capability or support, these measures are viewed as being sufficient in at least many application settings to virtually guarantee reliable conveyance and receipt of such information even in the absence of such measures. Though a given event or condition may impair or prohibit a given one of the interfaces from properly effecting these tasks, it is highly unlikely that all three of the interfaces for any given one of the data-based terrestrial vehicular components will be similarly impaired in response to the same failure mode.

Similarly, though some event or condition may break or otherwise disrupt a given one of the data busses, it is unlikely that all three of the data busses will be similarly disrupted at the same time (presuming, of course, that alternative physical routing techniques are employed for each such data bus). Furthermore, even if a given event did succeed in breaching all three data busses, the bi-directional functionality and capability of each of the data busses continues to ensure that data will continue to reach its intended destination. So configured, all three data busses must be breached or broken on multiple sides of a given terrestrial vehicular component in order to successfully isolate that terrestrial vehicular component from the data-bearing infrastructure of the terrestrial vehicle. So long as even only one of the data busses survives intact, that terrestrial vehicular component may continue to remain operationally effective.

Figure 9:
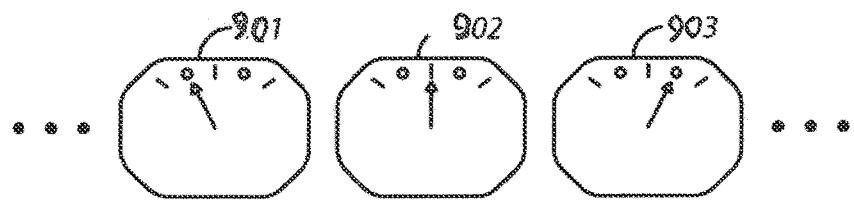
FIG. 9 comprises front elevational views as configured in accordance with various embodiments of the invention.

Referring now to FIG. 9, yet other approaches towards dealing with the previously mentioned challenges will be presented. In particular, FIG. 9 presents an illustrative example of ways by which certain data-based vehicular components, and particularly information gauge displays, can have reduced (or effectively eliminated) software content, copper-based data pipelines, and so forth.

By this approach, one provides a memory having a plurality of images stored therein. This plurality of images comprises a view of at least one information gauge at a variety of different readings. To illustrate, this can comprise a plurality of views 901-903 of a given information gauge where the views differ from one another with respect to the gauge reading. By one approach, essentially all practically possible gauge readings are represented in this manner.

Accordingly, by this approach, the memory contains a view of the information gauge at each reading as corresponds to a given range of readings and a desired degree of precision.

These teachings are readily applied with any of a wide variety of image types. By one approach, these images can comprise photographic images of the corresponding information gauge at the different readings. By another approach, these images can comprise virtual renderings of the information gauge at the variety of different readings. By yet another approach, these images can comprise a composite of both real and virtual images (for example, the gauge representation itself can comprise a photographic image while the value indicator comprises a virtual element).

Figure 10:
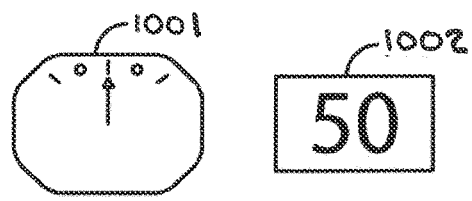
FIG. 10 comprises front elevational views as configured in accordance with various embodiments of these teachings.

It would of course be possible for this memory to contain a set of images for more than one information gauge. By one approach this might comprise information gauges for differing types of information. By another approach this might comprise information gauges for a same type of information. By way of illustration, and referring now momentarily to FIG. 10, this can comprise providing a first set of information gauge images that correspond to what appears to be an analog information gauge 1001 and a second set of information gauges as correspond to what appears to be a digital information gauge 1002, where both information gauges present information regarding a same metric, data value, or operational parameter.

Those skilled in the art will recognize and understand that, as used herein, the expression "information gauge" encompasses a wide variety of information-imparting contrivances. These include, but are not limited to, both analog and digital gauges of various traditional kinds as well as presently less common examples such as heads-up displays or other composite presentations where the gauge information is presented in combination with other information (such as an actual or virtual view of a forward view out the front windshield). The information conveyed can also vary in form and substance in various ways. For example, the information conveyed can comprise a simple numerical value. As another example, however, the information conveyed can instead comprise a non-numeric indication (corresponding, for example, to a textual or iconic representation of such things as a sense of "full" or "empty," "safe" or "dangerous," or "normal" or "abnormal," to note but a few examples in this regard). It is also possible for such information to comprise yet other kinds of data such as, for example, a virtual representation of a street or upcoming street intersection or driveway that is overlaid on an actual view of the corresponding terrain.

Those skilled in the art will appreciate that the above-described memory is readily enabled using any of a wide variety of available and/or readily configured storage platforms of various type, capacity, volatility, and so forth. It will also be understood that the reference to a "memory" may comprise a reference to a single storage platform or to a plurality of storage platforms as may be available when using a distributed storage architecture.

These teachings will readily accommodate providing the terrestrial vehicle 100 with a display that is operably coupled to this memory. By one approach, such a display is provided in the vehicle passenger cabin to enable its use by the driver or other passengers. The display itself can comprise any of a wide variety of displays that are presently known or that are hereafter developed, provided that the display is capable of presenting a rendering of the aforementioned information gauge images as per these teachings. Some examples would include, but are not limited to, tube-based displays, flat panel displays, and heads-up displays of various kinds. The display may be true color, multi-chromatic, or monochromatic as desired. As these teachings are relatively insensitive to the selection of any particular choice in this regard, for the sake of brevity further elaboration in this regard will not be presented here.

By one approach, upon being provided with information regarding a given monitored parameter (such as, for example, a monitored vehicular parameter such as speed), this information is used as an address for the aforementioned memory. That is, the value of the parameter of interest is itself correlated to the address of the information gauge view that itself corresponds to that parameter value. By one approach, when the memory addressing scheme permits, this can comprise a literal one-for-one correlation. In other instances where the memory addressing scheme is incompatible for whatever reason with such an approach, a simple look-up table corollary can be used to correlate the parameter value with the corresponding information gauge image.

Having established the memory address using the received parameter value information, one then accesses the memory to thereby retrieve and provide a view of the information gauge having a reading that substantially corresponds to this information. The aforementioned display can then display this particular information gauge view to thereby provide the information regarding the monitored parameter to a viewer.

By one approach, the aforementioned information regarding a monitored parameter is received on a relatively frequent basis in what amounts to substantially real time. So configured, the aforementioned steps regarding use of the information to specify a particular memory address followed by accessing the memory to retrieve and display the corresponding information gauge view can be repeated on a relatively regular basis (thereby achieving, for example, a 60 Hz refresh rate). So configured, a highly compelling and realistic presentation of an information gauge that smoothly tracks, in substantially real time, the parameter of interest can be achieved.

Figure 11:
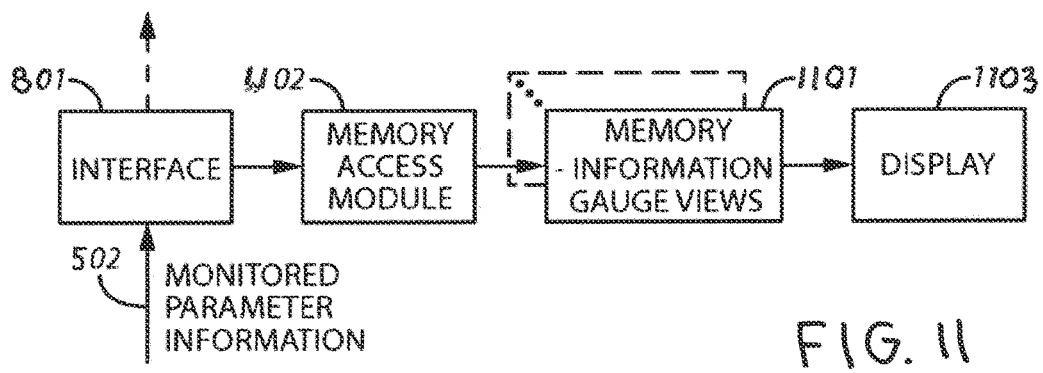
FIG. 11 comprises a block diagram as configured in accordance with various embodiments of these teachings.

By way of further illustration, and referring now to FIG. 11, an interface 801 (such as, for example, a vehicle data bus interface as has been described above) can couple to a data bus 502 to thereby receive monitored parameter information of interest. This can comprise, as noted, essentially real-time information regarding a presently monitored parameter such as a monitored vehicular parameter of interest.

This interface 801 couples to a memory access module 1102 that in turn couples to the aforementioned memory 1101 (or memories as the case may be) that contains the aforementioned information gauge views. This memory access module 1102 is configured and arranged to facilitate the steps described above. This can comprise, in particular, receiving the monitored parameter information, using that information as an address for the memory, and accessing the memory using that address to provide a view of the information having a reading that substantially corresponds to the information to a corresponding display 1103.

Consistent with these teachings, if desired, this memory access module 1102 (like the interface 801 itself) can comprise a softwareless component. This can again be realized using hard-wired logic as necessary to achieve the described functionality.

Figure 12:
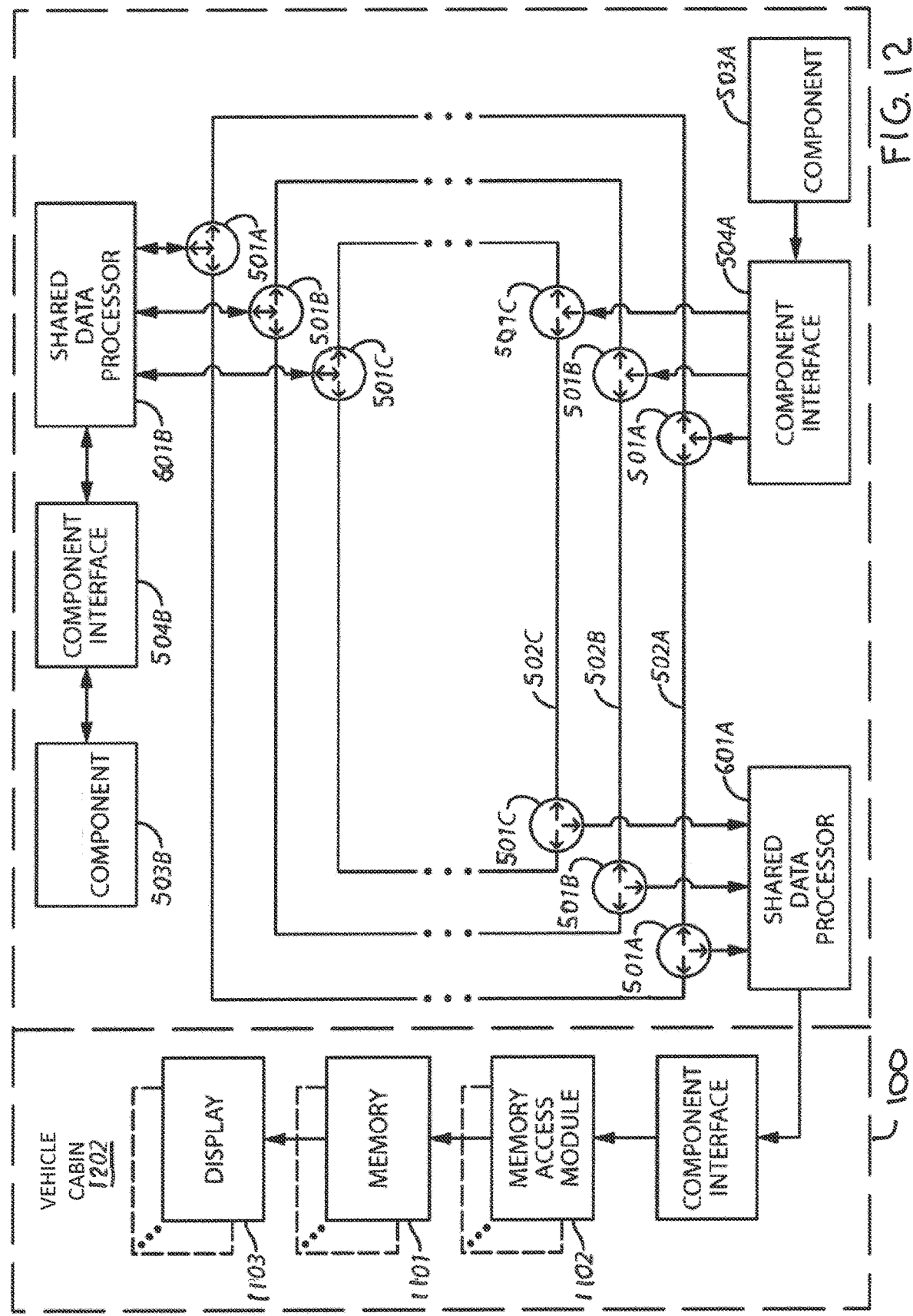
FIG. 12 comprises a block diagram as configured in accordance with various embodiments of these teachings.

These various teachings can be individually applied with significant benefits being attained. In the aggregate, however, the results appear even more dramatic. To illustrate, and referring now to FIG. 12, a given terrestrial vehicle 100 can have a data bus architecture as described above that comprises three separate and discrete optical data busses 502A-502C that are each configured as a ring and that each accommodate bi-directional data transmissions using a shared data handling protocol that lacks native error correction functionality and capability. A plurality of data buss interfaces 501A-501C (and, at least in some cases, a corresponding component interface 504A and 504B) are then used to connect each of these separate optical data busses 502A-502C to each of a plurality of terrestrial vehicle components, including vehicle components 503A that source data, vehicle components 503B that both source and receive data, and vehicle components that receive data (such as the vehicle components depicted in FIG. 12 that reside within the vehicle cabin 1202).

In this illustrative embodiment, at least some of the vehicle components that receive data are shown as further being deployed in conjunction with the aforementioned shared data processors 601A-601B to facilitate the aggregated processing and use of the incoming redundant data streams prior to passing a corresponding representative parameter value to the corresponding vehicle component. This illustrative embodiment also depicts one of the vehicle components as comprising, in the aggregate, a memory access module 1102, an information gauge views-containing memory 1101, and display 1103 as described above.

So configured, for example, monitored parameter information as sourced by a first vehicle component 503A is transmitted via each of the separate optical data busses 502A-502C using, with each such data bus, a separately designed and manufactured data bus interface 501A-501C. This information can be received and evaluated by a given shared data processor 601A to provide a corresponding representative value that is based on the value received via each of the three data busses 502A-502C to the memory access module 1102. The latter then uses that representative value to address the memory 1101 and thereby cause provision of a particular information gauge view to be displayed on the vehicle cabin display 1103.

The extensive substitution of optical fiber for copper conductors in such a deployment can lead to large weight savings for the resultant terrestrial vehicle. The design and makeup of the data-bearing infrastructure is seen to provide for a level of robustness and reliability that should readily support dispensing with error correcting data handling protocols. This, in turn, permits considerably simplified logic and data handling functionality which then leads to a genuine opportunity to field data-handling platforms that are devoid of software. This lack of software requirements can then lead to enormous savings with respect to the cost of developing, testing, debugging, and deploying such a system as compared to traditional practice in this regard.

These benefits extend directly into the cabin of the terrestrial vehicle where fully virtual information gauges are offered in a manner that again eschews the need for much overhead software. In fact, taken as an aggregation of practices, these teachings provide for a data-bearing transport system of such high reliability (based upon this combination of redundancies, simplicity, minimized common mode failure opportunities, and software avoidance) that it should now be possible to design, build, and deploy terrestrial vehicles as shown that lack any mechanical gauges whatsoever.

Beyond the many benefits noted above, these teachings facilitate and support using a single connection between a component and such an optical network to simultaneously receive, for example, both operating power as well as two-way data service. Such an approach directly reduces terrestrial vehicle assembly requirements (including a likely reduction in assembly time, training, and available supplies/materials).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A terrestrial vehicle comprising:
at least a first structural component;
at least one electrically-operated terrestrial vehicular component that comprises a data-capable component;
a light-to-electricity conversion component having a light-receiving input and an electricity-providing output, wherein the electricity-providing output is conductively coupled to the at least one electrically-operated terrestrial vehicular component;
at least a first source of light secured to the structural component, wherein the first source of light is configured, at least in part, to modulate at least portions of the light with informational content;
at least a first light-bearing conduit operably coupled between:
the first source of light and the light-receiving input of the light-to-electricity conversion component to thereby convey light from the first source of light to the light-receiving input of the light-to-electricity conversion component such that the light-to-electricity conversion component provides electricity to operate the at least one electrically-operated terrestrial vehicular component; and
the first source of light and the electrically-operated terrestrial vehicular component such that the electrically-operated terrestrial vehicular component receives at least part of the informational content.

2. The terrestrial vehicle of claim 1 wherein the first source of light outputs light in both a visible and non-visible spectrum.

3. The terrestrial vehicle of claim 1 further comprising:
at least a second and third light-bearing conduit that also operably couple to a light-receiving input of the light-to-electricity conversion component to thereby also convey light to the light-to-electricity conversion component such that the light-to-electricity conversion component converts the light conveyed by the second and third light-bearing conduits into electricity to operate the at least one electrically-operated terrestrial vehicular component.

4. The terrestrial vehicle of claim 3 wherein the first, second, and third light-bearing conduits are disposed within the terrestrial vehicle distal from one another.

5. The terrestrial vehicle of claim 1 wherein the first light-bearing conduit has a cross-section sufficient to conveys at least 1 watt of light-based power.

6. The terrestrial vehicle of claim 1 wherein the first source of light provides a first light component that conveys power to the electrically-operated terrestrial vehicular component and a second light component that comprises a visible marker to warn of an active light source.

7. The terrestrial vehicle of claim 1 wherein the first source of light comprises a plurality of optically-discrete light sources.

8. The terrestrial vehicle of claim 7 wherein at least one of the optically-discrete light sources provides light to serve as a source of light-to-electricity power, at least one of the optically-discrete light sources provides surface illumination visible light, and at least one of the optically-discrete light sources provides light to serve as a data carrier for the informational content.

9. The terrestrial vehicle of claim 1 wherein the first source of light is configured, at least in part, to modulate at least portions of the light with informational content on a continuous basis.

10. The terrestrial vehicle of claim 1 wherein the first source of light is configured, at least in part, to modulate at least portions of the light with information content on a repeated basis.

11. The terrestrial vehicle of claim 1 wherein the at least one electrically-operated terrestrial vehicular component comprises at least one of:
   an electrically-operated terrestrial vehicular component that facilitates a locomotion capability of the terrestrial vehicle;
   an electrically-operated terrestrial vehicular component that facilitates sensing an operating status of at least one aspect of the terrestrial vehicle;
   an electrically-operated terrestrial vehicular component that facilitates passenger comfort; or
   an electrically-operated terrestrial vehicular component that facilitates providing informational content to a passenger.

12. The terrestrial vehicle of claim 1 further comprising:
   an electricity-storage component that is operably coupled between the electricity-providing output of the light-to-electricity conversion component the at least one electrically-operated terrestrial vehicular component.

13. The terrestrial vehicle of claim 1 further comprising:
   at least one illumination component configured to provide surface illumination using visible light provided via at least one light-bearing conduit as sourced by at least one source of light that is secured to a structural component that comprises a part of the terrestrial vehicle.

14. The terrestrial vehicle of claim 13 wherein the at least one source of light comprises the first source of light.

15. The terrestrial vehicle of claim 13 wherein the at least one illumination component is configured to provide interior surface illumination for the terrestrial vehicle.

16. The terrestrial vehicle of claim 13 wherein the at least one illumination component is configured to provide exterior surface illumination for the terrestrial vehicle.

17. The terrestrial vehicle of claim 1 further comprising:
   a plurality of light-bearing conduits that variously in the aggregate convey:
   visible light to a plurality of illumination components that are configured to provide surface illumination;
   data-bearing light to and/or from a plurality of data-capable components; and
   power-conveying light to a plurality of light-to-electricity conversion components.

18. The terrestrial vehicle of claim 1 wherein at least some, but not all, of the light-bearing conduits include supplemental, conformal, thermally-insulative cladding.

* * * * *